United States Patent
Hombo

(10) Patent No.: US 8,373,908 B2
(45) Date of Patent: Feb. 12, 2013

(54) DOCUMENT READING APPARATUS

(75) Inventor: Tsunao Hombo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 597 days.

(21) Appl. No.: 12/506,041

(22) Filed: Jul. 20, 2009

(65) Prior Publication Data

US 2010/0027080 A1 Feb. 4, 2010

(30) Foreign Application Priority Data

Jul. 30, 2008 (JP) ................................. 2008-196848

(51) Int. Cl.
*H04N 1/04* (2006.01)
(52) U.S. Cl. ......... 358/474; 358/497; 358/498; 358/486
(58) Field of Classification Search .................. 358/474, 358/497, 498, 486, 494
See application file for complete search history.

(56) References Cited

U.S. PATENT DOCUMENTS

| | | | | |
|---|---|---|---|---|
| 2002/0054361 A1 | 5/2002 | Saito | .............................. | 358/400 |
| 2004/0066541 A1 | 4/2004 | Tseng et al. | .................. | 358/474 |
| 2006/0050329 A1 * | 3/2006 | Yokota | .......................... | 358/474 |
| 2006/0109524 A1 * | 5/2006 | Schnitzlein | .................... | 358/474 |
| 2008/0198426 A1 * | 8/2008 | Yokochi | ........................ | 358/486 |
| 2008/0304111 A1 * | 12/2008 | Queenan et al. | .............. | 358/302 |

FOREIGN PATENT DOCUMENTS

| | | |
|---|---|---|
| JP | 8-195860 | 7/1996 |
| JP | 2002-281202 | 9/2002 |
| JP | 2005-17572 | 1/2005 |

OTHER PUBLICATIONS

Office Action dated Sep. 6, 2011 in counterpart European Application No. 09166771.7.
Machine-generated English translation of Japan 2002-281202 (Ricoh).

* cited by examiner

*Primary Examiner* — Houshang Safaipour
(74) *Attorney, Agent, or Firm* — Fitzpatrick, Cella, Harper & Scinto

(57) ABSTRACT

A document reading apparatus includes a housing that has conductive characteristics, a platen that is provided with the housing and that has translucency, and an image reading unit that is arranged so as to be movable in the housing and that reads a document placed on the platen. In particular, at least one opening is provided in a region of the housing that overlaps with the image reading unit as viewed in a direction orthogonal to the platen.

9 Claims, 9 Drawing Sheets

EXAMPLE OF RADIATION INTENSITY WHEN NO OPENING PART IS PROVIDED

EXAMPLE OF RADIATION INTENSITY
WHEN OPENING PART IS PROVIDED IN OPTIMAL POSITION

120a

EXAMPLE OF RADIATION INTENSITY WHEN OPENING PART SIZE IS INSUFFICIENT

EXAMPLE OF RADIATION INTENSITY
WHEN OPENING PART IS PROVIDED IN UNSUITABLE POSITION

DOCUMENT READING APPARATUS

BACKGROUND OF THE INVENTION

1. Field of the Invention

The present invention relates to a document reading apparatus, and particularly relates to a structure for suppressing radiated electrical (electromagnetic) noise.

2. Description of the Related Art

Conventionally, an image reading apparatus reads a bound original by scanning the bound original while moving a reading unit constituted by a carriage member supporting an image sensor. This has been proposed in, for example, Japanese Patent Laid-Open No. 8-195860. This image sensor includes a light source that linearly illuminates an original document (hereinafter referred to as an original) in a main-scanning direction; an imaging means that images light reflected from the original illuminated by the light source; a photoelectric conversion means that converts image information about the original into a read image signal by making the reflected light imaged by the imaging means enter the photoelectric conversion means; and an image signal sending means that sends the image signal created by the photoelectric conversion. In particular, the reading unit is connected to an image signal receiving unit via a flexible cable serving as the image signal sending means and being flexible. An image reading apparatus having such a structure has an advantage that the thickness of the apparatus can be reduced.

However, assuming such a structure, the reading unit is put in an electrically floating state in a high-frequency region, and so there is a possibility that a driving signal for the image sensor may cause radiated electrical noise. A driving signal for driving the light source or the image sensor, which are used to read an image, requires a large current because of the photoelectric conversion that is performed. Moreover, in order to realize high-speed reading, a high-frequency signal is necessary. Therefore, ICs for driving the light source means or the image sensor repeatedly send/receive high-frequency and large-current signals therebetween each time an image is read, and thus there is a remarkable amount of radiated noise.

Japanese Patent Laid-Open No. 2005-17572 proposes a measure to reduce radiated noise in an image reading apparatus. Specifically, according to Japanese Patent Laid-Open No. 2005-17572, a flexible cable is kept in contact with a housing and the like while being moved. It is stated that the occurrence of radiated noise is thus reduced.

However, radiated noise does not occur only from the flexible cable. The reading unit moves in a sub-scanning direction during an image reading operation, and the magnitude of the radiated noise changes depending on the sub-scanning position of the reading unit. That is to say, the radiated noise may increase substantially depending on the sub-scanning position. The inventor of the present invention conducted research and found that this is due to electromagnetic coupling between the reading unit and the housing that has conductivity.

SUMMARY OF THE INVENTION

It is desirable to provide a solution for at least one of the above-described and other problems. For example, it is desirable to reduce the radiated noise without causing a great increase in the costs of anti-vibration measures and measures to improve the load-bearing capacity. Note that the other problems that are desirous to be solved will be understood by reading through the entire description of this specification.

The present invention in its first aspect provides a document (sometimes referred to as "an original") reading apparatus comprising: a housing that has a conductive characteristics; a platen that is provided with the housing and that is translucent; and an image reading unit that is arranged so as to be movable in the housing and to read a document placed on the platen, wherein at least one opening is provided in a region of the housing that overlaps with the image reading unit as viewed in a direction orthogonal to the platen.

The present invention in its second aspect provides a document (original) reading apparatus comprising: a frame member that has conductive characteristics; a platen that is provided with the frame member; and an image reading unit that is arranged so as to be movable along the frame member and that reads a document placed on the platen, wherein, the frame member has, at a predetermined position, a process area for decreasing a capacitance formed by the image reading unit and the frame member by preventing a resonance from occurring on a circuit formed by the image reading unit and the frame member.

Further features of the present invention will become apparent from the following description of exemplary embodiments with reference to the attached drawings.

DESCRIPTION OF THE EMBODIMENTS

Embodiments of the present invention will now be described. The individual embodiments described below will be useful in understanding various concepts of the present invention including superordinate concepts, intermediate concepts, and subordinate concepts. Moreover, it should be understood that the technical scope of the present invention is defined by the appended claims and not limited by the individual embodiments below.

Figure 1:
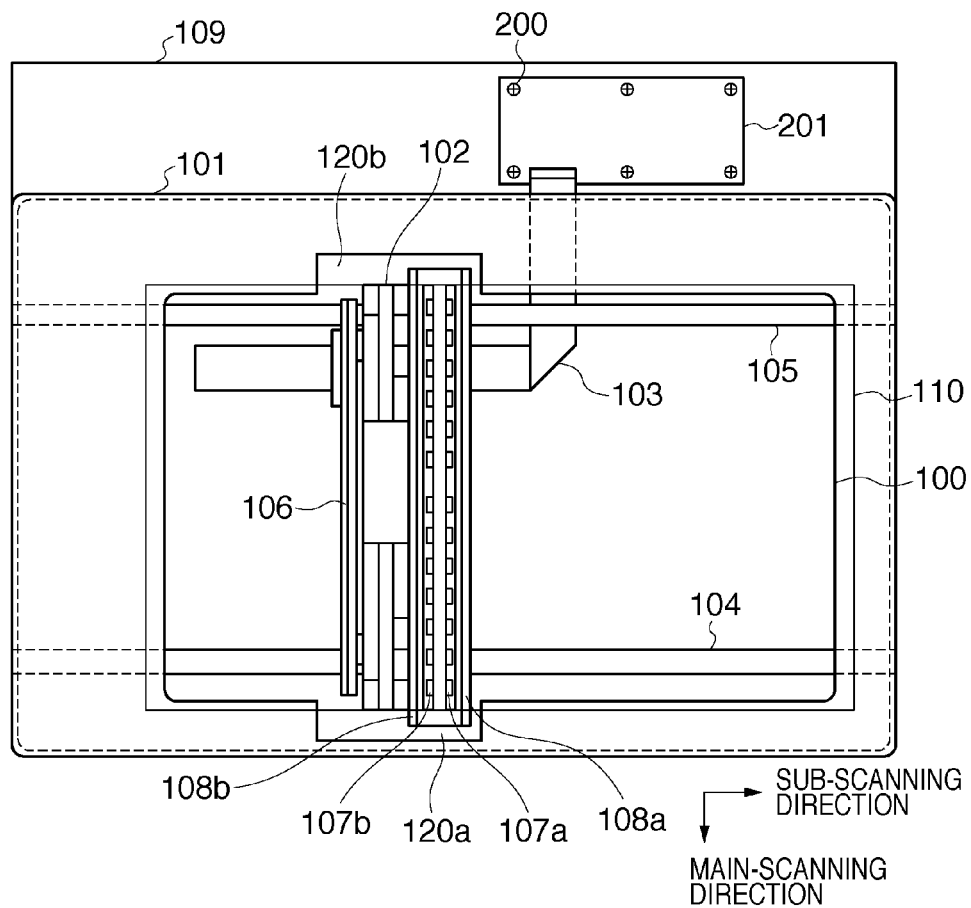
FIG. 1 is a plan view of an image reading apparatus according to Embodiment 1.
Figure 2:
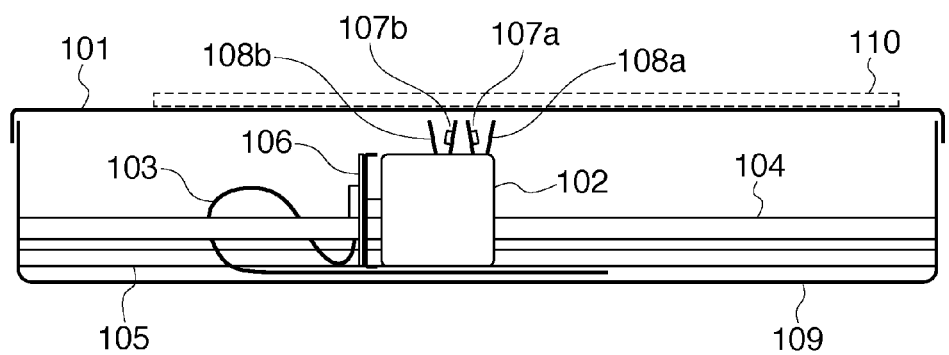
FIG. 2 is a cross-sectional view of the image reading apparatus according to the aforementioned embodiment.

FIG. 1 is a plan view of an image reading apparatus according to Embodiment 1. FIG. 2 is a cross-sectional view of the image reading apparatus according to this embodiment. The external shape of the image reading apparatus is formed by a housing upper frame 101 and a housing lower frame 109 that are conductive members. The conductive members are formed from any material which has conductive characteristics. That is to say, a housing of the image reading apparatus is mainly constituted by the upper frame and the lower frame, which have conductive characteristics.

Figure 3:
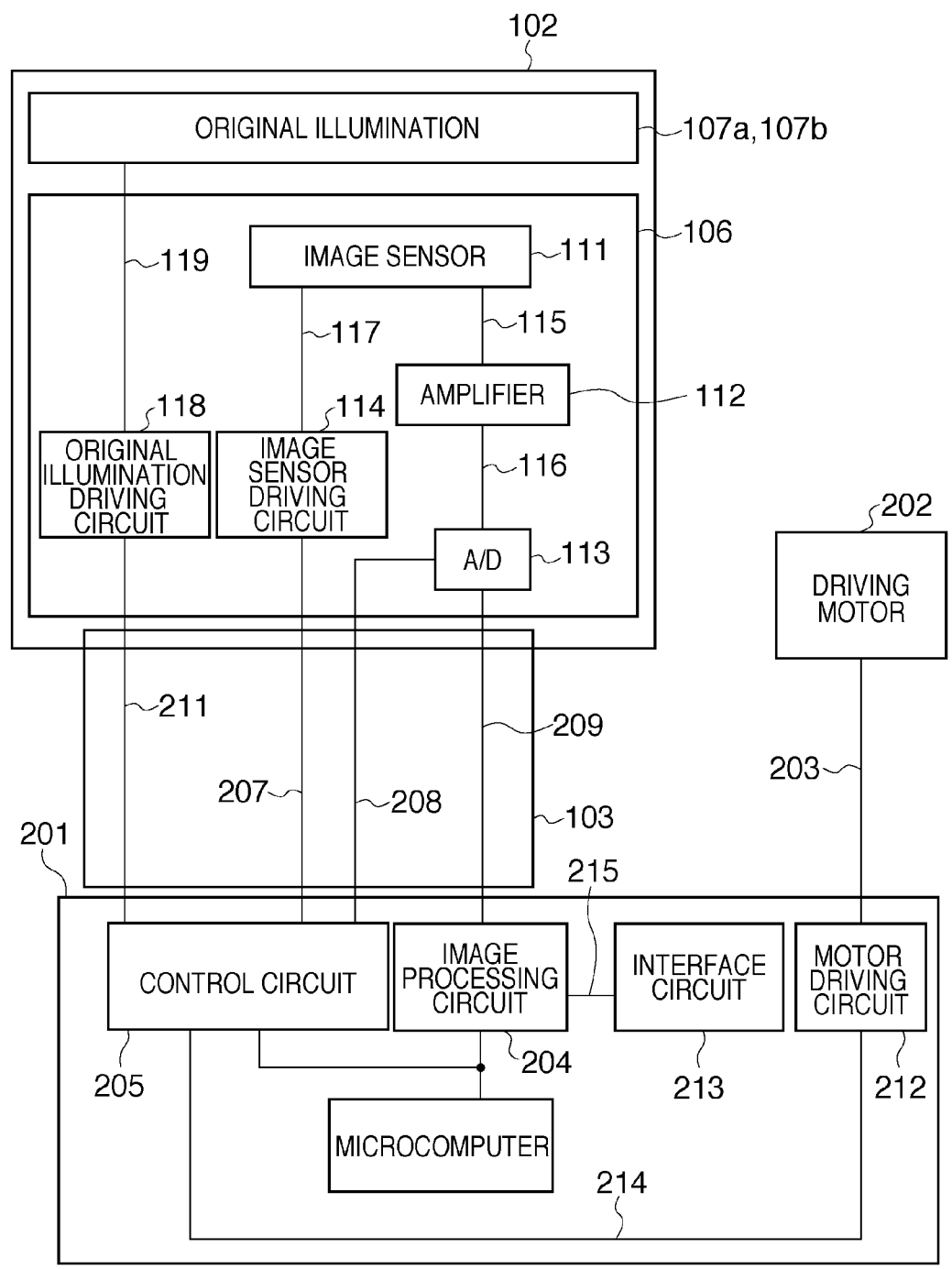
FIG. 3 is a block diagram showing functions of the image reading apparatus.

An original platen glass 110 for placing an original thereon is provided in an opening part 100 provided in the housing upper frame 101. An image reading unit 102 moves along frame members such as the housing upper frame 101 and the housing lower frame 109. According to this embodiment, the image reading unit 102 provided within the housing reads an image on the original while moving from the left side of FIG. 1 toward the right side (i.e., in the sub-scanning direction). Note that the image reading unit 102 is driven by a later-described driving motor 202 (FIG. 3). The image reading unit 102 is maintained in a horizontal position by a driving shaft 104 and a guide rail 105.

The image reading unit 102 is an example of the image reading unit that is arranged to be movable in a housing and that reads an original placed on an original platen. The image reading unit 102 is constituted by an image sensor substrate 106, original illuminations 107a and 107b, reflection plates 108a and 108b, and optical components. During an image reading operation, the original illuminations 107a and 107b illuminate the original placed on the original platen glass 110. The original platen glass 110 is an example of the original platen that is provided in the upper frame of the housing and that is translucent. The original platen glass 110 is not necessarily required to be made of glass.

Light reflected from the original is imaged on an image sensor mounted on the image sensor substrate 106 via the optical components. The image sensor substrate 106 is connected to a control substrate 201 via a cable 103.

The original illuminations 107a and 107b may be tubular light sources such as cold-cathode tubes or may be groups of linearly arranged point light sources such as LEDs. The original illuminations 107a and 107b have almost the same lengths as the length of an image reading region in the main-scanning direction. The reflection plates 108a and 108b are metal plates or substrates on which a metal has been vapor-deposited, and have lengths equal to or longer than the lengths of the original illuminations 107a and 107b. The control substrate 201 is fixed to the housing lower frame 109 by screws 200, and a ground of the control substrate 201 is also connected to the housing lower frame 109 via the screws 200.

Although the image reading unit 102 is not in contact with the frame members, the image reading unit 102 and the frame members are in proximity to each other and form a capacitance. Accordingly, a circuit is formed by the image reading unit 102 and the frame members. Then, when there is a predetermined relationship between the circuit length of this circuit and the wavelength of a reference clock signal supplied to the image reading unit 102, a resonance phenomenon occurs on this circuit, which in some cases causes amplification of the radiated noise. In order to alleviate or prevent this resonance phenomenon, it is desirable to perform a process for decreasing the capacitance formed by the image reading unit 102 and the frame members on a predetermined position of the frame members. This type of process includes, as an embodiment, processing methods in which the predetermined position of the frame members is cut out or a plurality of holes are formed in the predetermined position of the frame members. That is, there is cut out and/or the holes at a process area in which the process is applied. The process area prevents a resonance that occurs on a circuit formed by the image reading unit and the frame member. Note that the processing method is not limited to these methods, and any processing method that can decrease the resonance is sufficient.

In particular, in FIG. 1, cutouts 120a and 120b for suppressing the radiated noise are provided in the housing upper frame 101. The positions and sizes of the cutouts 120a and 120b are determined theoretically or experimentally so that the radiated noise is reduced. Specifically, portions of the upper frame 101 of the housing are cut out, the portions overlapping with the image reading unit 102 as viewed in a direction orthogonal to the moving direction (moving plane) of the image reading unit 102. That is to say, the cutouts 120a and 120b are an example of the at least one opening, cutout or missing portion provided in a region of the upper frame of the housing that overlaps with the image reading unit. In the present embodiment, the moving plane of the image reading unit 102 is a plane parallel to the original platen glass 110.

FIG. 3 is a block diagram showing functions of the image reading apparatus. An image sensor 111 mounted on the image sensor substrate 106 receives the light reflected from the original via the optical components, converts the light into an image data 115 (an electric signal), and outputs the image data 115. The image data 115 is amplified by an amplifier 112 into amplified image data 116. The amplified image data 116 is converted into a digital signal 209 by an AD converter 113. The digital signal 209 is transmitted to an image processing circuit 204 on the control substrate 201 via the cable 103. The image processing circuit 204 performs image processing such as gamma correction on the inputted digital signal 209 and generates a digital signal 215 that has undergone the image processing. The digital signal 215 is transmitted to an image forming apparatus, which is not shown, via an interface circuit 213.

A control circuit 205 on the control substrate 201 generates a reference signal 207 for driving the image sensor 111. The reference signal 207 is transmitted to an image sensor driving circuit 114 on the image sensor substrate 106 via the cable 103. The image sensor driving circuit 114 generates an image sensor driving signal 117 from the reference signal 207 and drives the image sensor 111 with the image sensor driving signal 117.

The control circuit 205 generates a reference clock signal 208 for the AD converter 113 on the image sensor substrate 106 and a control signal 211 for the original illuminations 107. The reference clock signal 208 is input to the AD converter 113 also via the cable 103. Note that the radiated noise is a harmonic component of the reference clock signal 208 used for the image reading unit, and the frequency of the radiated noise is 30 MHz or higher.

The control signal 211 is inputted to an original illumination driving circuit 118 also via the cable 103. The original illumination driving circuit 118 generates a signal 119 for driving the original illuminations 107a and 107b according to the control signal 211 and supplies the signal 119 to the original illuminations 107a and 107b.

Furthermore, the control circuit 205 generates a reference signal 214 for controlling the driving motor 202. A motor driving circuit 212 converts the reference signal 214 into a motor driving signal 203 and controls the driving motor 202.

As described above, the reference clock, the digital image data, and the like are sent/received via the cable 103 by which the image reading unit 102 and the control substrate 201 are coupled. However, since the image reading unit 102 has a weak high-frequency connection to a ground of the image reading apparatus due to its own structure, the radiated noise is likely to occur from the image reading unit 102 itself and the cable 103.

Figure 4:
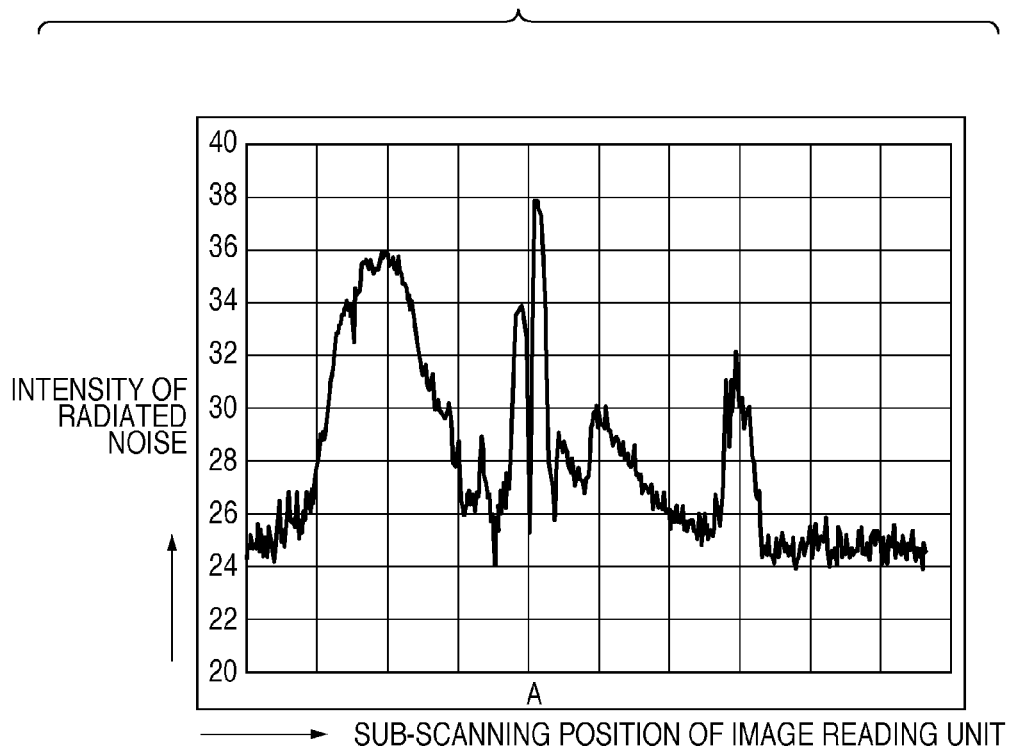
FIG. 4 is a diagram showing the relationship between the intensity of radiated noise (frequency F) that occurs during an original reading operation of a conventional image reading apparatus and the sub-scanning position of an image reading unit.
Figure 4:
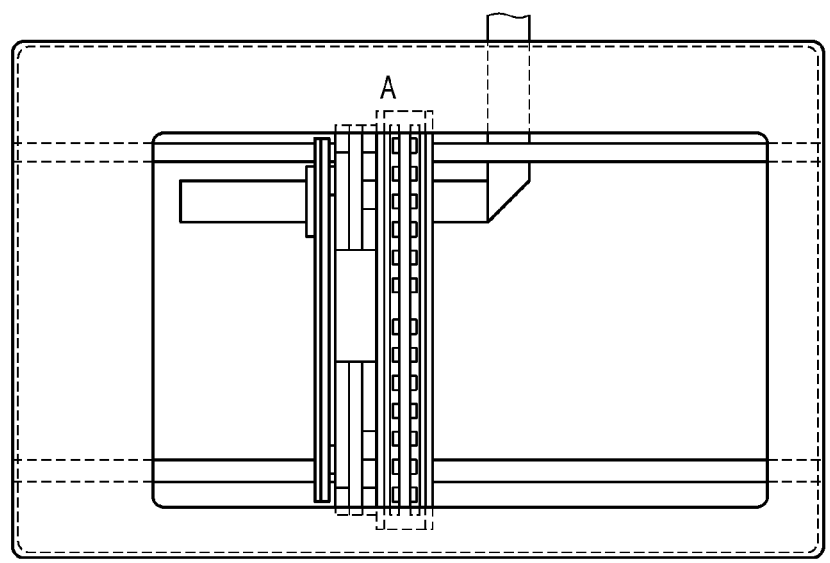

FIG. 4 is a diagram showing the relationship between the intensity of radiated noise (frequency F) that occurs during an original reading operation using a conventional image reading apparatus (unit) and the sub-scanning position of the image reading unit. In the conventional image reading apparatus, the upper frame provided with an opening or cutout is replaced by an upper frame without an opening or cutout. FIG. 4 shows the intensity of the radiated noise from the start of reading of an image to the end of the reading in this conventional image reading apparatus. As shown in FIG. 4, there are approximately three peaks of the radiated noise. In particular, the peak of the radiated noise at a sub-scanning position A is the maximum.

It is considered that such radiated noise occurs because the image sensor substrate 106, the original illuminations 107a and 107b, and the reflection plates 108a and 108b, which constitute the image reading unit 102, are conductive members.

Figure 5:
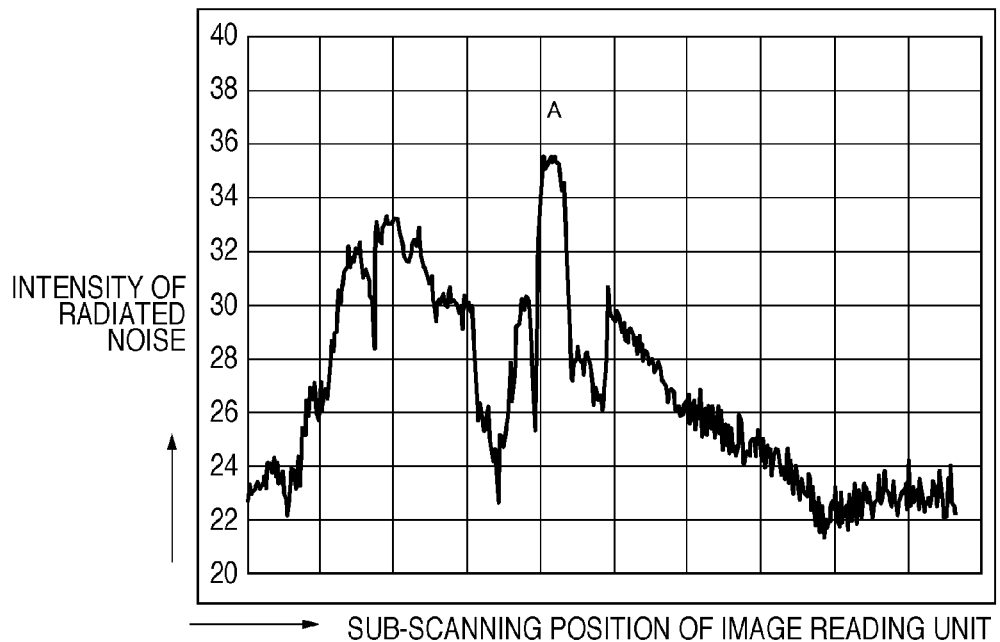
FIG. 5 is a diagram showing the relationship between the intensity of radiated noise (frequency F) that occurs during an original reading operation of the image reading apparatus according to the aforementioned embodiment and the sub-scanning position of an image reading unit.
Figure 5:
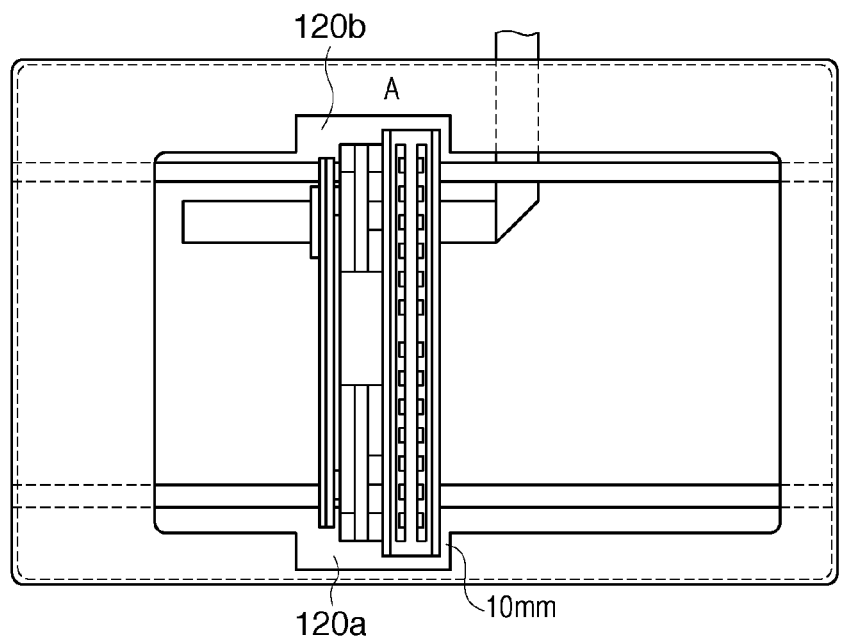

FIG. 5 is a diagram showing the relationship between the intensity of radiated noise (frequency F) that occurs during an original reading operation of the image reading apparatus according to this embodiment and the sub-scanning position of the image reading unit. In FIG. 5, the cutouts 120a and 120b for alleviating the electromagnetic coupling that is considered to be the cause of the radiated noise are provided in the sub-scanning position A. Thus, FIG. 5 shows that the intensity of the radiated noise is reduced at A in particular, but also overall when compared with FIG. 4. Note that FIG. 5 shows that the intensity of the radiated noise at the time when the image reading unit 102 is in a position other than the sub-scanning position A is also reduced when compared with FIG. 4.

Incidentally, the shortest distance from the edges of each cutout in the housing upper frame 101 to the conductive members of the image reading unit 102 is about 10 mm. In particular, an effect of reducing the radiated noise is enhanced when the distance from the edges of each cutout to the conductive members of the image reading unit 102 in the main-scanning direction is about 10 mm or longer. Thus, it is desirable that the cutouts have such a shape that the distance between each cutout and the edges of the conductive members constituting the image reading unit is 10 mm or longer.

Figure 6:
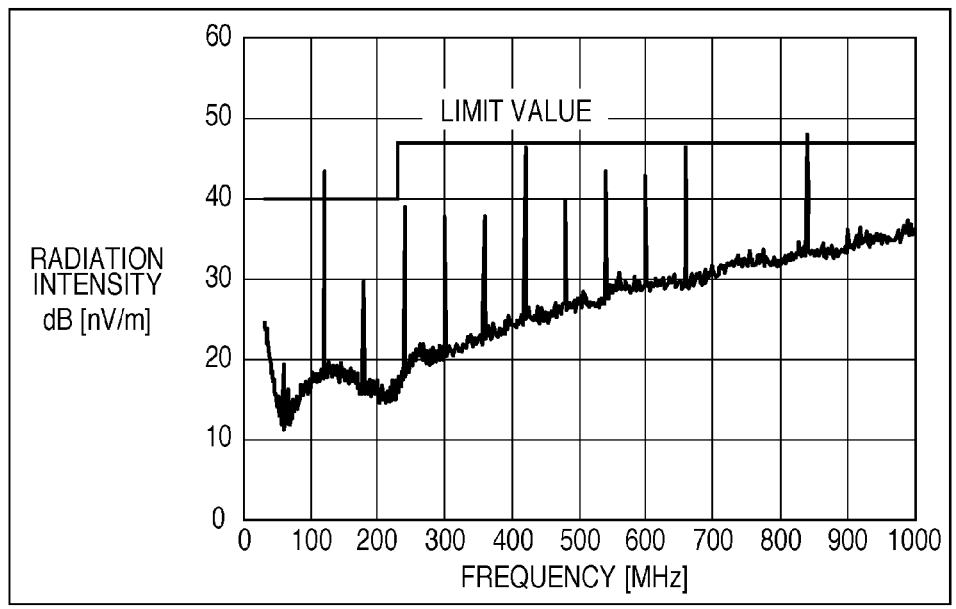
FIG. 6 is a graph showing an example of the results of a measurement in which the intensity of radiated noise of a conventional example was measured in compliance with a measurement standard "VCCI-Class B 3m method".

FIG. 6 is a graph showing an example of the results of a measurement in which the intensity of radiated noise of a conventional example was measured in compliance with a measurement standard "VCCI-Class B 3 m method". The horizontal axis represents the measurement frequency, and the vertical axis represents the intensity of the radiated noise.

A horizontal line drawn in the vicinity of 40 dB to 50 dB in FIG. 6 shows a limit value of the radiated noise intensity specified or regulated by this measurement method. An electronic device that produces radiated noise of an intensity exceeding this standard can adversely affect another electronic device that is used in conjunction therewith. Accordingly, it is necessary to design an electronic device so that the intensity of radiated noise produced by that electronic device does not exceed this limit value.

In the example shown in FIG. 6, it is found that radiated noise exceeding the limit value occurs at frequencies of about 120 MHz and about 840 MHz. Moreover, radiated noise whose intensity is near the limit value also occurs at various other frequencies.

Figure 7:
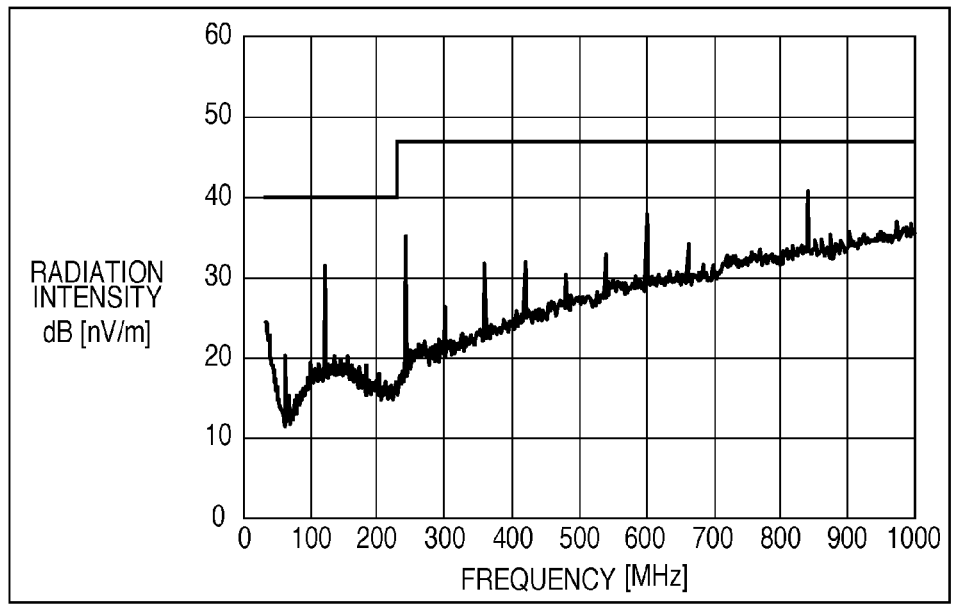
FIG. 7 is a graph showing an example of the results of a measurement in which the intensity of radiated noise of the present embodiment was measured in compliance with the measurement standard "VCCI-Class B 3m method".

FIG. 7 is a graph showing an example of the results of a measurement in which the intensity of radiated noise of the present embodiment (including the opening or cutout) was measured in compliance with the measurement standard "VCCI-Class B 3m method". It was confirmed by an experiment that the intensity of the radiated noise was significantly lower than the limit value at every frequency.

Figure 8:
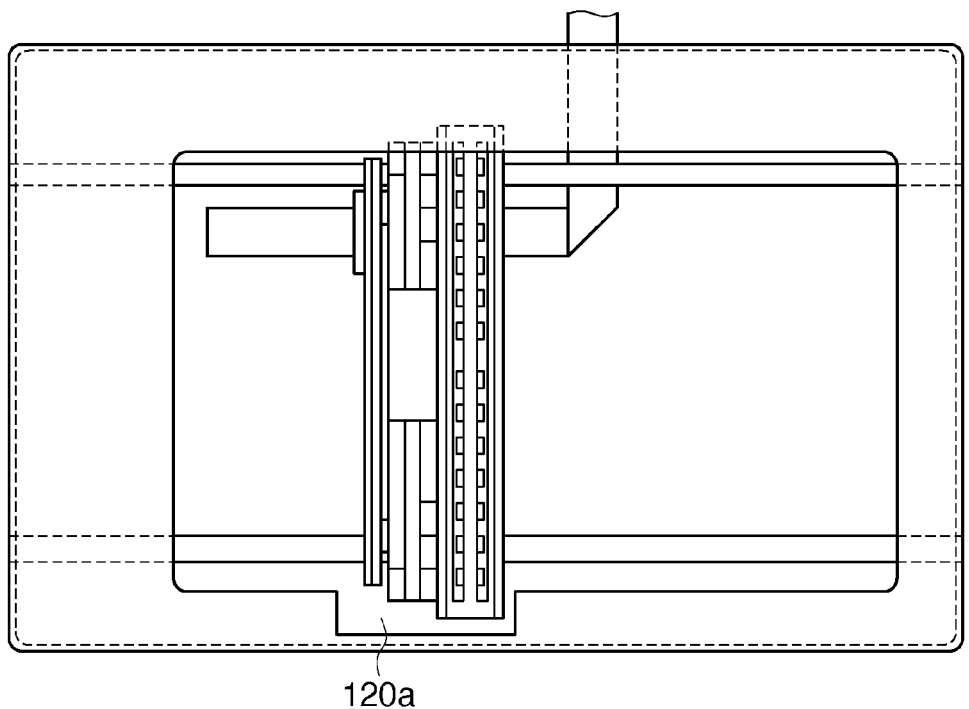
FIG. 8 is a plan view showing a first comparative example (a variation) in which a single cutout is provided.

FIG. 8 is a plan view showing a first comparative example (a variation) in which a single cutout is provided. As shown in FIG. 8, the first cutout 120a is provided, but the second cutout 120b is omitted.

Figure 9:
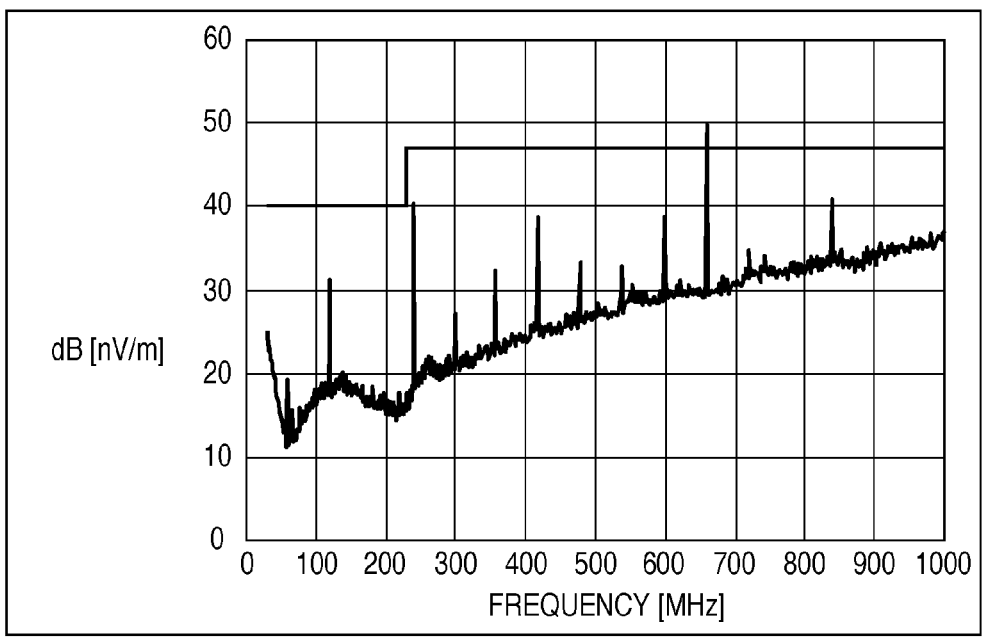
FIG. 9 is a graph showing an example of the results of a measurement in which the intensity of radiated noise of the first comparative example was measured in compliance with the measurement standard "VCCI-Class B 3m method".

FIG. 9 is a graph showing an example of the results of a measurement in which the intensity of radiated noise of the first comparative example was measured in compliance with the measurement standard "VCCI-Class B 3m method". In FIG. 9, the intensity of the radiated noise is reduced when compared with FIG. 6. However, in FIG. 9, the margin from the limit value is decreased when compared with FIG. 7.

Figure 10:
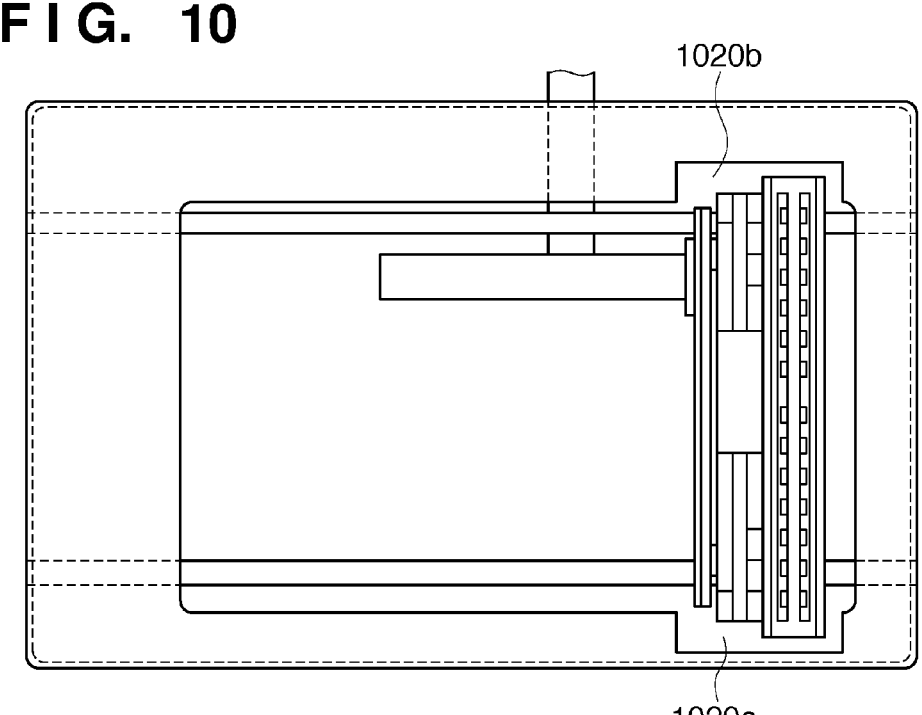
FIG. 10 is a plan view of an image reading apparatus of a second comparative example (a variation) in which cutouts are provided in positions different from those shown in FIG. 1.

FIG. 10 is a plan view of an image reading apparatus of a second comparative example (a variation) in which cutouts are provided in positions different from the positions shown in FIG. 1. Also in FIG. 10, two cutouts 1020a and 1020b are provided. However, the positions where the cutouts 1020a and 1020b are provided are shifted rightward from the positions of the cutouts 120a and 120b shown in FIG. 1.

Figure 11:
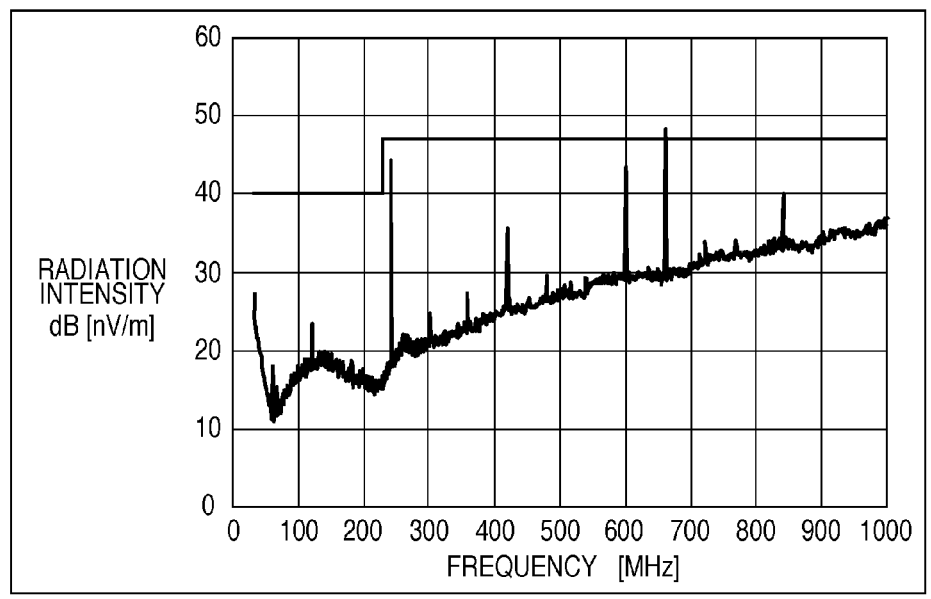
FIG. 11 is a graph showing an example of the results of a measurement in which the intensity of radiated noise of the second comparative example was measured in compliance with the measurement standard "VCCI-Class B 3m method".

FIG. 11 is a graph showing an example of the results of a measurement in which the intensity of radiated noise of the second comparative example was measured in compliance with the measurement standard "VCCI-Class B 3m method". In FIG. 11, the intensity of the radiated noise is reduced when compared with FIG. 6. However, in FIG. 11, the margin from the limit value is decreased when compared with FIG. 7.

As described above, when at least one cutout is provided, the effect of reducing the radiated noise can be achieved without causing a great increase in the costs of anti-vibration measures and measures to improve the load-bearing capacity. Note that the reducing effect is enhanced when one or more cutouts having such a size that the image reading unit 102 and the housing upper frame 101 do not overlap each other (when viewed from above the apparatus) are provided. Furthermore, it can be said that the effect of reducing the radiated noise is enhanced further by appropriately (e.g. as shown in FIG. 5 rather than as shown in FIG. 10) setting the position where a cutout is provided.

In Embodiment 1, one or more cutouts are employed as a means for reducing radiated noise. In Embodiment 2, a porous structure is used as the cutout.

Figure 12:
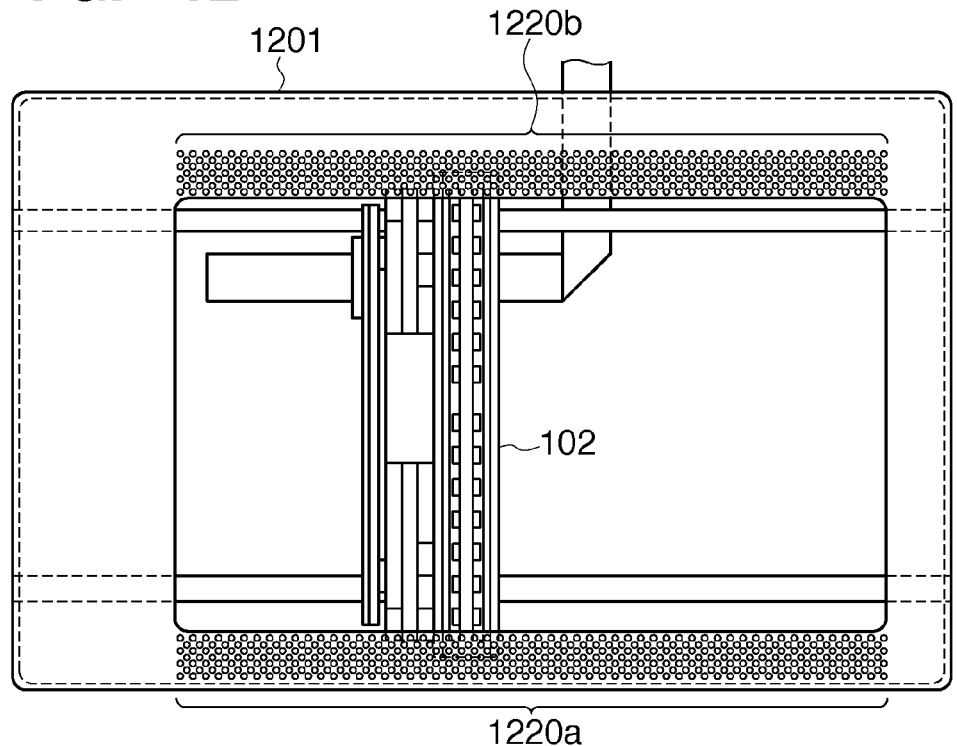
FIG. 12 is a plan view of an image reading apparatus according to Embodiment 2.

FIG. 12 is a plan view of an image reading apparatus according to Embodiment 2. Regions of a housing upper frame 1201 that overlap with the image reading unit 102 have the porous structure 1220a and 1220b. It was found that by employing such a porous structure, currents flowing to the regions where the housing upper frame 1201 and the image reading unit 102 overlap each other are decreased. This is because the porous structure increases the impedance of the overlapping regions.

Thus, by employing a porous structure, the radiated noise can be effectively reduced without causing a great increase in the costs of anti-vibration measures and measures to improve the load-bearing capacity. Note that the porous structure may be provided only in overlapping regions that are above the image reading unit 102 at the time when the image reading unit 102 is in the above-described sub-scanning position A. Alternatively, as shown in FIG. 12, the porous structure may be provided in overlapping regions above the entire moving range of the image reading unit 102. It is desirable that the position and area of a region where the porous structure is to be provided is determined by experiment or theoretical analysis so that a target amount of the reduction in the radiated noise can be achieved.

A reinforcing member for reinforcing strength may also be provided above or below the cutouts of Embodiment 1 or the porous portions of Embodiment 2. Moreover, at least a part or the whole of the cutouts of Embodiment 1 or the porous portions of Embodiment 2 may be covered with the original platen glass. In this case, the original platen glass functions also as a reinforcing member.

Figure 13:
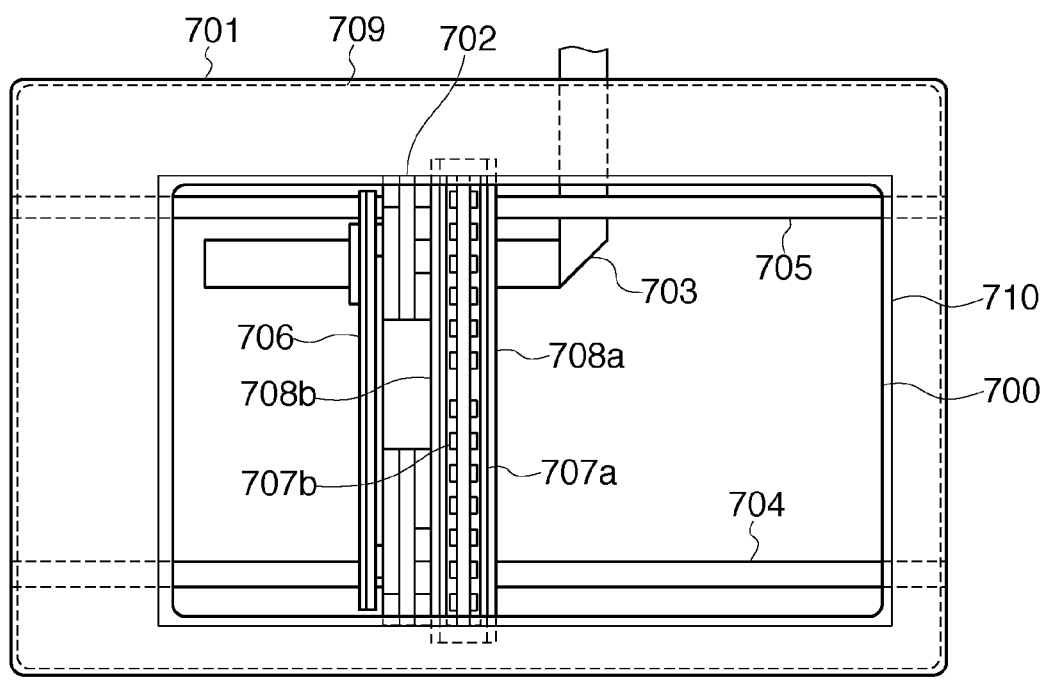
FIG. 13 is a plan view showing an example of a conventional image reading apparatus.

FIG. 13 is a plan view showing an example of an image reading apparatus of a related art. An image reading apparatus has a box-like external shape formed by a housing upper frame 701 and a housing lower frame 709 that are conductive members. An original platen glass 710 for placing an original thereon is provided in an opening part 700 provided in the housing upper frame 701. An image reading unit 702 provided within a housing reads an image on the original while moving from the left side of FIG. 13 toward the right side (i.e., in the sub-scanning direction). The image reading unit 702 is maintained in a horizontal position by a driving shaft 704 and a guide rail 705.

The image reading unit 702 is constituted by an image sensor substrate 706, original illuminations 707*a* and 707*b*, reflection plates 708*a* and 708*b*, and optical components. During an image reading operation, the original illuminations 707*a* and 707*b* illuminate the original placed on the original platen glass 710. Light reflected from the original is imaged on an image sensor mounted on the image sensor substrate 706 via the optical components. The image sensor substrate 706 is connected to a control circuit via a cable 703.

Figure 14:
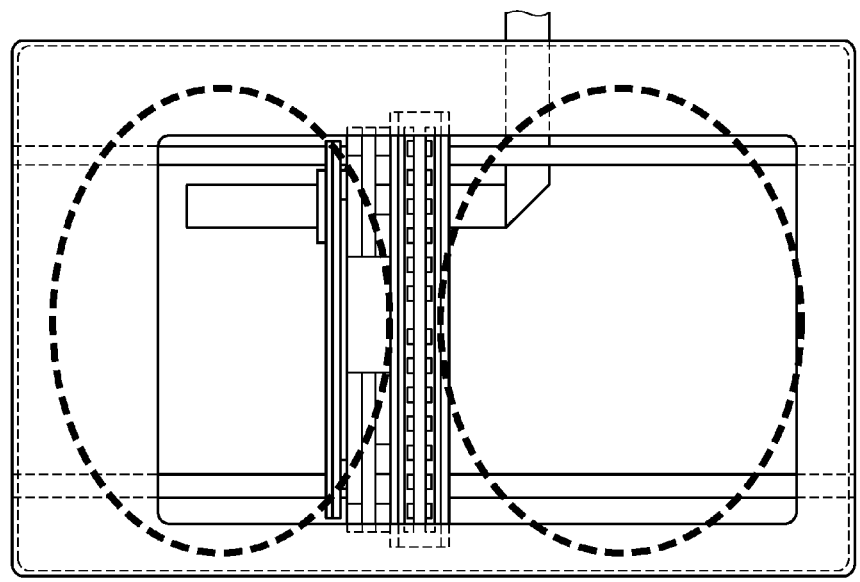
FIG. 14 is a diagram showing the distribution of an electric field on a top face of the image reading apparatus.

FIG. 14 is a diagram showing the distribution of an electric field on a top face of the image reading apparatus of the related art. Broken lines in FIG. 14 show positions where the electric field strength is relatively large when the image reading unit 702 is in a position shown in FIG. 14. That is to say, the image reading unit 702 and the housing upper frame 701 are formed of conductive members, and, therefore, when there is a predetermined positional relationship between the image reading unit 702 and the housing upper frame 701, electromagnetic coupling occurs, which results in an electric resonance.

Thus, a phenomenon in which radiated noise occurs depending on the moving position of a reading unit that is in an electrically floating state in a high-frequency region does not originate from a cable. For this reason, it can be said that the radiated noise cannot be reduced by a conventional method.

Figure 15:
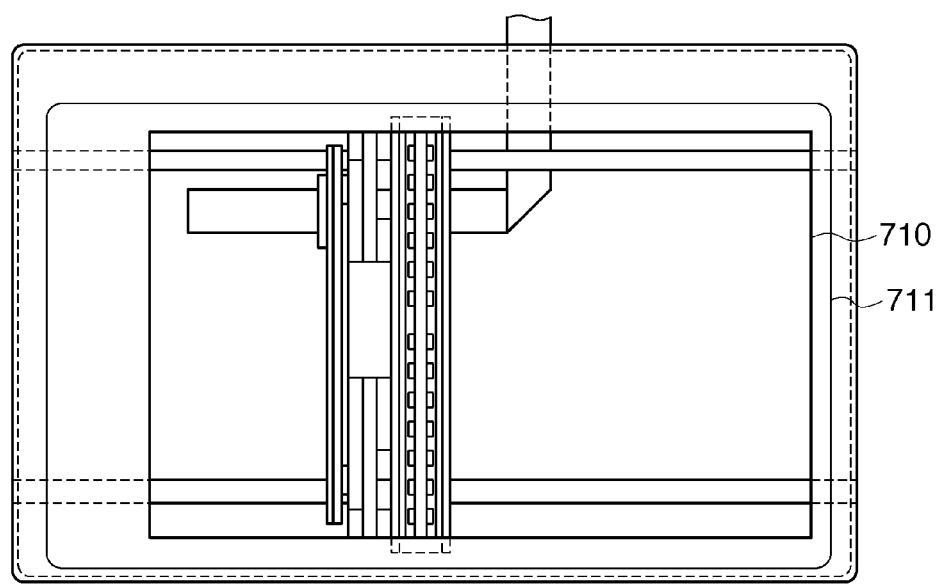
FIG. 15 is a plan view of an image reading apparatus with an enlarged opening part.

FIG. 15 is a plan view of an image reading apparatus with an enlarged opening part. In order to avoid the above-described electromagnetic coupling, the housing may be constituted by a non-conductive member, or an enlarged opening part 711 may be employed. With an enlarged opening part, the image reading unit 702 no longer overlaps with the housing upper frame 701. However, these configurations necessitate suppressing vibration due to an increase in the speed of the image reading apparatus or satisfying the load-bearing capacity required of the original platen glass, and thus considerably increase the cost.

As described above, when compared with the related arts, the present invention can reduce the radiated noise without causing a great increase in the costs of anti-vibration measures and measures to improve the load-bearing capacity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-196848, filed Jul. 30, 2008 which is hereby incorporated by reference herein in its entirety.

What is claimed is:

1. A document reading apparatus comprising:
   a housing that has conductive characteristics;
   a platen that is provided with the housing and that is translucent; and
   an image reading unit that is movable in a sub-scanning direction in the housing to read a document placed on the platen,
   wherein at least one opening is provided in a region of an upper frame of the housing that overlaps with the image reading unit at a position corresponding to a sub-scanning position of the image reading unit that has a peak in intensity of radiated noise in the case where the at least one opening is not provided.

2. The document reading apparatus according to claim 1, wherein the radiated noise is a harmonic component generated by a clock signal that is used for the image reading unit.

3. The document reading apparatus according to claim 1, wherein the opening is a cutout.

4. The document reading apparatus according to claim 1, wherein the opening has a porous structure.

5. A document reading apparatus comprising:
   a housing that has conductive characteristics;
   a platen that is provided with the housing and that is translucent; and
   an image reading unit that is movable in a sub-scanning direction in the housing to read a document placed on the platen,
   wherein at least one opening is provided in a region of an upper frame of the housing that overlaps with the image reading unit at a position corresponding to a sub-scanning position of the image reading unit that has a peak in intensity of radiated noise in the case where at least one opening is not provided, the opening is a cutout, and a distance between the cutout and a conductive member constituting the image reading unit is 10 mm or longer.

6. A document reading comprising:
   a frame member that has conductive characteristics;
   a platen that is provided with the frame member; and
   an image reading unit that is movable along the frame member and that reads a document placed on the platen,
   wherein the frame member has, at a predetermined position, a process area for decreasing a capacitance formed by the image reading unit and the frame member by preventing a resonance from occurring on a circuit formed by the image reading unit and the frame member, wherein a plurality of holes are provided in the process area.

7. A document reading apparatus comprising:

a housing that has conductive characteristics;

a platen that is provided with the housing and that is translucent; and an image reading unit that is movable in a sub-scanning direction in the housing to read an image from a document placed on the platen, wherein a the platen has a side being parallel to the sub-scanning direction and supported by an upper frame of the housing, and a plurality of holes are provided at a region of the upper frame which supports the side of the platen.

8. The document reading apparatus according to claim 7, wherein the region of the housing is a region neighboring an edge of the platen in the sub-scanning direction.

9. The document reading apparatus according to claim 7, wherein the image reading unit is movable without contacting with an upper frame of the housing and the porous structure is provided at the upper frame of the housing.

* * * * *